United States Patent
Rakotoarivelo et al.

(10) Patent No.: US 6,961,311 B2
(45) Date of Patent: Nov. 1, 2005

(54) ADAPTIVE SCHEDULING WINDOW MANAGEMENT FOR A QUALITY OF SERVICE ENABLED LOCAL AREA NETWORK

(75) Inventors: Thierry Rakotoarivelo, Waverley (AU); Raad Raad, Cringila (AU); Christopher Ware, Leichhardt (AU)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/436,517

(22) Filed: May 13, 2003

(65) Prior Publication Data

US 2004/0228281 A1 Nov. 18, 2004

(51) Int. Cl.[7] .................................................. H04J 1/16
(52) U.S. Cl. ...................... 370/238; 370/447; 709/223
(58) Field of Search ................................. 370/338, 447, 370/232, 238, 252, 329, 462, 414, 352–356, 400, 401, 386, 395.1, 230.1; 709/200, 223, 238–244; 455/12.1

(56) References Cited

U.S. PATENT DOCUMENTS

| | | | |
|---|---|---|---|
| 6,452,915 B1 | * | 9/2002 | Jorgensen .................... 370/338 |
| 6,570,849 B1 | * | 5/2003 | Skemer et al. ............ 370/230.1 |
| 2002/0071449 A1 | * | 6/2002 | Ho et al. ..................... 370/447 |
| 2003/0012166 A1 | * | 1/2003 | Benveniste .................. 370/338 |
| 2004/0210619 A1 | * | 10/2004 | Balanchandran et al. ... 709/200 |

* cited by examiner

Primary Examiner—John Pezzlo
(74) Attorney, Agent, or Firm—Daniel K. Nichols; Matthew C. Loppnow

(57) ABSTRACT

A method (600) performed by a packet scheduler of an access point (215) of adaptively resizing a scheduling window in a Quality of Service enabled Local Area Network (200) is disclosed. The packet scheduler schedules data packets for a given duration, termed a scheduling window. The packet scheduler according to an embodiment of the invention adaptively changes the duration of the scheduling window based on the QoS requirements of data packets to be transmitted to and from the access point (215). In particular, the duration of the scheduling window is changed based on the delay requirement of the data packet having the most constraint QoS requirement.

17 Claims, 4 Drawing Sheets

ADAPTIVE SCHEDULING WINDOW MANAGEMENT FOR A QUALITY OF SERVICE ENABLED LOCAL AREA NETWORK

FIELD OF THE INVENTION

The present invention relates generally to communication over a network and, in particular although not necessarily limited to, the management of a scheduling window in a Quality of Service enabled wireless local area networks.

BACKGROUND

Devices communicating over network links are becoming increasingly popular especially when the network links are wireless links typically formed from radio frequency links. One basic mode in which most radio-frequency-based wireless devices are designed to operate in is an infrastructure ("IS") mode. In the infrastructure mode, which is also sometimes referred to as the managed network mode, each wireless device communicates with another device in the network through an access point of the network. The access point functions as a bridge, repeater, gateway, and firewall between wireless devices for a given coverage area and wired devices of the network.

Wireless networks are also used for the transfer of multimedia data streams, such as video-on-demand, video-conferencing, and on-line brokerage services. Such data streams are time-sensitive, as any significant delay in the transfer of data packets of such data streams degrades the quality of the service provided to the data stream.

The bandwidth over a wireless communication channel is limited, and relatively narrow. To best utilise the limited bandwidth, while meeting the delay requirements of data to be transmitted by multiple wireless devices over the shared communication channel, the concept of Quality of Service (QoS) has been introduced. The access point, and in particular a packet scheduler in the access point, attempts to apportion bandwidth of the communication channel to the wireless devices to satisfy the QoS requirements of the data to be transferred. For example, in a network that supports multimedia services, the packet scheduler typically gives a higher priority to time-sensitive multimedia data streams so that their packets are transmitted with less delay than packets of data streams less affected or unaffected by delay.

Data packets from the various wireless device sources are scheduled for transmission by the packet scheduler for a given duration, that duration being called a scheduling window. In general, the scheduling window is a submultiple of a Contention Free Period (CFP). During the CFP, the packet scheduler manages all access of the shared communication channel by polling the wireless devices in a slotted fashion.

However, the unreliability of the wireless communication channel makes packet scheduling for the shared wireless communication channel a challenging problem. Furthermore, in the case of data flows from wireless devices to the access point, known as uplink flows, the packet scheduler does not have instant knowledge of the flow state, which typically includes the size of the data queue at the wireless device, the size of the individual data frames to be transmitted over the wireless communication channel, the instantaneous physical transmission rate to be used by the wireless device, the QoS requirements of the flow (expressed in terms of delay, bandwidth, jitter, or any other relevant metric).

The QoS requirements differ from other flow state elements in that they are signalled during connection set up and therefore known in advance. The remainder of the flow state elements are dynamic. If the QoS requirements change during the lifetime of a connection, the new requirements are signalled to the access point.

The access point therefore relies on feedback information from the originating wireless devices. The feedback information is then interpolated, and packet scheduling is performed based on the interpolations.

With a large scheduling window, the interpolations may become inaccurate due to the unreliability of the wireless communication channel and inaccuracies in the interpolations. However, by reducing the duration of the scheduling window arbitrarily, an extra computational burden is placed on the access point.

Thus, a need clearly exists for selecting the duration of the scheduling window that is appropriate for the QoS requirements of the data flows, without incurring an extra computational burden.

SUMMARY

According to an aspect of the present invention, there is provided a method of adaptively changing the duration of a scheduling window of a quality of service enabled local area network. The method comprises the steps of determining a minimum delay of delay requirements of data flows in the network to be scheduled, calculating the duration of the scheduling window based on the minimum delay, and applying the duration of the scheduling window at a next scheduling interval.

Preferably, the duration of the scheduling window is shorter than a minimum of: a Contention Free Period plus a Contention Period, and half of the minimum delay.

According to another aspect of the present invention, there is provided a packet scheduling device in a quality of service enabled local area network for adaptively changing the duration of a scheduling window. The packet scheduling device comprises a transceiver for communicating with another communication device in the local area network, a memory for storing information about delay requirements of data flows to be scheduled, and a processing unit coupled to the memory and the transceiver for processing the communications. The processing unit determines a minimum delay of the delay requirements of the data flows to be scheduled, calculates the duration of the scheduling window based on the minimum delay, and applies the duration of the scheduling window at a next scheduling interval.

According to yet another aspect of the present invention, there is provided a quality of service enabled wireless local area network comprising: a plurality of wireless devices, each wireless device having one or multiple associated data flow(s) and each of the data flows having an associated delay requirement; and a packet scheduling device for scheduling the data flows during a scheduling window period, wherein the packet scheduling device adaptively changes the duration of the scheduling window period based on a minimum of the delay requirements of the data flows.

Other aspects of the invention are disclosed hereinafter.

BRIEF DESCRIPTION OF THE DRAWINGS

One or more embodiments of the present invention are described with reference to the drawings, in which.

DETAILED DESCRIPTION

Figure 1:
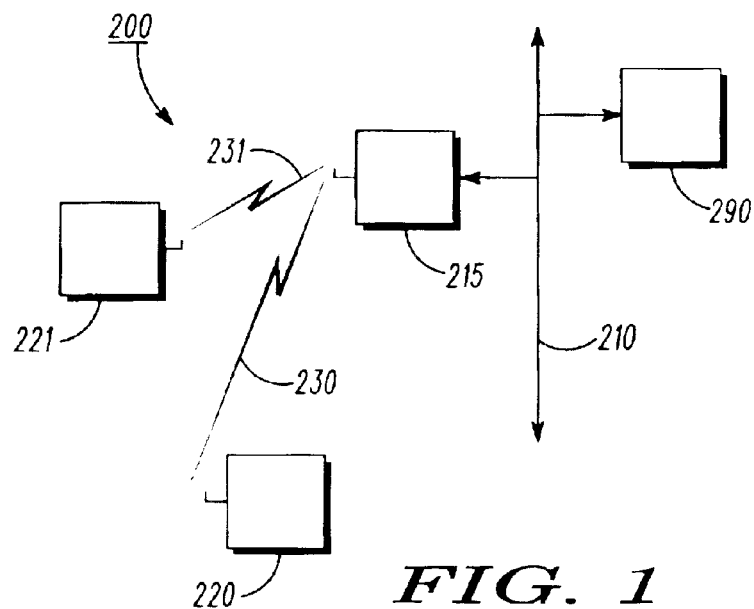
FIG. 1 is a schematic block diagram of a Wireless Local Area Network environment, with which embodiments of the invention may be practiced.

Methods, packet scheduling devices, access points, and wireless local area networks are disclosed for adaptively changing the duration of a scheduling window of a quality of service (QoS) enabled wireless local area network (WLAN). In the following description, numerous specific details, including wireless network standards, processors, and access point functions, are set forth. However, from this disclosure, it will be apparent to those skilled in the art that modifications and/or substitutions may be made without departing from the scope and spirit of the invention. In other circumstances, specific details may be omitted so as not to obscure the invention. Where reference is made in any one or more of the accompanying drawings to steps and/or features, which have the same reference numerals, those steps and/or features have for the purposes of this description the same function(s) or operation(s), unless the contrary intention appears.

The methods for adaptively changing the duration of a scheduling window of a QoS-enabled wireless LAN may be implemented in modules. A module, and in particular its functionality, can be implemented in either hardware or software. In the software sense, a module is a process, program, or portion thereof, that usually performs a particular function or related functions. Such software may be implemented in Java, C, C++, Fortran, for example, but may be implemented in any of a number of other programming languages/systems, or combinations thereof. In the hardware sense, a module is a functional hardware unit designed for use with other components or modules. For example, a module may be implemented using discrete electronic components, or it can form a portion of an entire electronic circuit such as an Field Programmable Gate Arrays (FPGA), Application Specific Integrated Circuit (ASIC), and the like. A physical implementation may also include configuration data for a FPGA, or a layout for an ASIC, for example. Still further, the description of a physical implementation may be in EDIF netlisting language, structural VHDL, structural Verilog or the like. Numerous other possibilities exist. Those skilled in the art will appreciate that the system can also be implemented as a combination of hardware and software modules.

FIG. 1 shows a schematic block diagram of a Wireless Local Area Network (WLAN) environment 200 operating in infrastructure mode. An access point 215 provides for an interconnection between a Local Area Network (LAN) 210 and wireless devices, such as a laptop computer 220 and a handheld device 221.

The access point 215 functions as a base station in a wireless LAN, and may be a stand-alone device that plugs into a network hub or server. Alternatively, the access point 215 may implemented in a plug-in card (e.g., ISA, PCI) for connection to the mainboard of a computer. Access points transmit radio frequency (RF) signals over a coverage area (e.g., several hundred feet or more), penetrating walls and other non-metal barriers. As in mobile or cellular phone systems, users are able to roam around with their mobile devices and be handed off between access points while remaining connected to the WLAN. The laptop computer 220 for example may have a wireless modem implemented in a PCMCIA card or as a device that plugs into an existing LAN (e.g, Ethernet) port. Various wireless network standards exist including IEEE 802.11, OpenAir, HomeRF, and Bluetooth.

Devices embodying the access point 215 may include one or more of the following functional modules: a bridge, a repeater, a gateway, and a firewall between wireless devices for a given coverage area and wired devices of the network. For example, a wireless cable modem gateway may include an wireless access point, a cable modem, a LAN router and switch, and a firewall.

While specific examples of wireless devices are given hereinafter, it will be appreciated by those skilled in the art that numerous other specific wireless devices may be practiced without departing from the scope and spirit of the invention. In particular, the access point 215 serves as an interface between the wireless devices 220 and 221 and wired devices, such as desktop computer 290, connected to the LAN 210. For the purpose of illustration, only a small number of wireless and wireless devices are depicted in FIG. 1 so as not to obscure the embodiments of the invention. In fact, the WLAN environment 200 typically includes a number of access points for interfacing wireless devices with the LAN 210. Through the access point 215 wireless devices 220 and 221 may also communicate with other wireless devices.

In the WLAN environment 200 illustrated in FIG. 1, the wireless devices 220 and 221 form radio frequency links 230 and 231 respectively with the access point 215 over a shared radio frequency communication channel. During the Contention Free Period, the access point 215 controls data flow to and from each of the wireless devices 220 and 221 within a given coverage area of the access point 215. An aspect of this control is exerted by a packet scheduler (not shown in FIG. 1) of the access point 215 by apportioning the bandwidth of the communication channel to the wireless devices 220 and 221. During the Contention Period, the access point 215 and the wireless devices 220 and 221 contend to access the communication channel using a Carrier Sense Multiple Access/Collision Avoidance (CSMA/CA) channel access technique.

The control of data flow by apportioning the bandwidth of the communication channel may similarly be performed by any wireless device 220 and 221 in the given coverage area. Accordingly, while the packet scheduler is implemented in the access point 215 in the embodiments described hereinafter, those skilled in the art will readily appreciate in view of this disclosure that the packet scheduler may be implemented in other devices.

Figure 2:
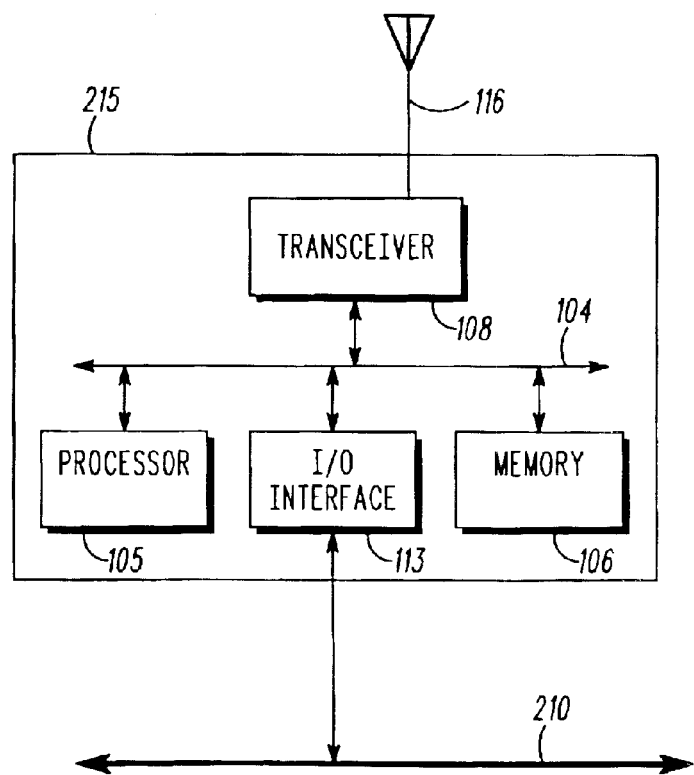
FIG. 2 is a more detailed schematic block diagram of the access point, with which embodiments of the invention may be practiced.

FIG. 2 shows a more detailed schematic block diagram of the access point 215 illustrated in FIG. 1. The access point 215 typically includes at least one processor 105, a memory unit 106, for example formed from semiconductor random access memory (RAM) and read only memory (ROM), an I/O interface 113 for connecting to LAN 210, and a transceiver 108 connected to an antenna 116. The processor 105 is a processing unit that processes data and carries out instructions, well known to those skilled in the art. The instructions may be carried out by interpreting and/or executing such instructions. For example, the processor 105 may be implemented using a IEEE 802.11 MAC processor or any suitable wireless processor. Numerous other processors and processing units may be practiced without departing from the scope and spirit of the invention. The components 105, 106, 108 and 113 of the access point 215 communicate via an interconnected bus 104 and in a manner which results in a mode of operation known to those in the relevant art. The antenna 116 may be an omnidirectional antenna.

Figure 6:
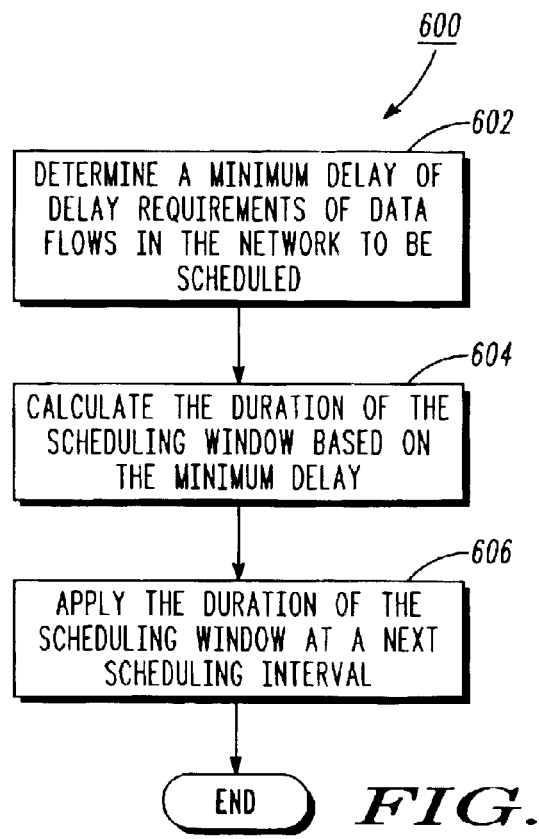
FIG. 6 is a flow diagram illustrating a method of adaptively changing the duration of a scheduling window of a QoS enabled wireless LAN in accordance with the embodiment of the invention.

FIG. 6 is a high-level flow diagram illustrating a process 600 of adaptively changing the duration of a scheduling window of a QoS enabled WLAN. This process 600 can be carried out by the access point 215 of FIGS. 1 and 2. In step 602, a minimum delay of delay requirements of data flows in the network to be scheduled is determined. The duration of the scheduling window is calculated based on the minimum delay at step 604. In step 606, the duration of the scheduling window is applied at a next scheduling interval. Details of this process are set forth in greater detail hereinafter.

The packet scheduler may be effected by instructions in software executing within the access point 215. The software is preferably resident in the memory 106, and read and controlled in its execution by the processor 105. Intermediate storage of data packets is accomplished using the semiconductor memory 106. Other forms of intermediate storage may be practiced without departing from the scope and spirit of the invention. For example, the memory 106 may store information about delay requirements of data flows in the network to be scheduled, amongst other things. Portions of or the entire packet scheduler may implemented in any device connected to the network and any portable wireless device that has a processor, memory, and a transceiver.

The packet scheduler schedules data packets for a given duration, termed the scheduling window. The maimer in which the bandwidth is apportioned depends largely on the Quality of Service (QoS) requirements of the data to be transferred to and from the access point 215 and the wireless devices 220 and 221. The access point 215 manages the communications of the wireless devices 220 and 221 by transmitting poll signals (termed "infrastructure poll signals") to direct each wireless devices 220 and 221 to transmit its respective data packets in a specified time period and in a slotted fashion.

The duration of the scheduling window influences the performance of the packet scheduler for a given set of QoS requirements. Accordingly, the packet scheduler according to an embodiment of the invention adaptively changes the duration of the scheduling window based on the QoS requirements of the data packets to be transmitted to and from the access point 215. In particular, the duration of the scheduling window is changed based on the delay requirement of the data packet having the most constrained QoS requirement, that is, a minimum delay of the delay requirements. Hence, the scheduling window according to an embodiment of the invention is decoupled from the superframe defined in the IEEE 802.11e specification.

Figure 7:
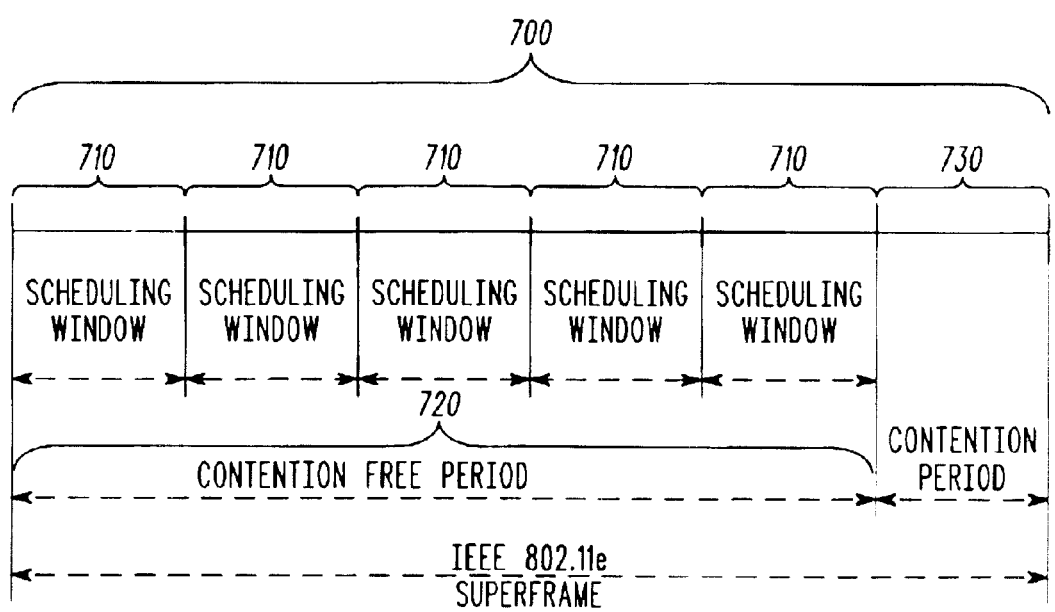
FIG. 7 illustrates a superframe defined in the IEEE 802.11e specification.

An example of a superframe 700 defined in the IEEE 802.11e specification is illustrated in FIG. 7. The duration of the superframe 700 is defined by an IEEE 802.11 Management information Base (MIB) variable as will be apparent to a person skilled in the art. Furthermore, the superframe 700 is divided into a contention free period 720 and a contention period 730. The duration of the contention period is defined by the MIB variable. The contention free period 720 is sub-divided into scheduling windows 710, the duration of which is adaptively changed by the invention.

An upper limit $D_{SW_{max}}$ for calculating the duration of the scheduling window is provided by the following:

$$D_{SW_{max}} = \min\{(D_{CFP}+D_{CP}), \tfrac{1}{2}\min\{D_{Fi}\}\}, \qquad (1)$$

where $D_{CFP}$ and $D_{CP}$ are the durations of the Contention Free Period (CFP) and the Contention Period (CP), respectively, as defined in the IEEE 802.11 standard, $D_{Fi}$ is the delay requirement of flow i, and $\min\{D_{Fi}\}$ is the minimum delay of delay requirements of data flows. The duration of the CFP $D_{CFP}$, duration of the CP $D_{CP}$, and delay $D_{Fi}$ are measured in time units (TU) of 1024 μs each. However, other time units (TU) may be practiced without departing from the scope and spirit of the invention.

For example, consider the case where the duration of the CFP $D_{CFP}$ is 45 TU, the duration of the CP $D_{CP}$ is 5 TU, and the delay requirement $D_{Fi}$ of all flows is 20 ms. Using Equation (1), the upper limit $D_{SW_{max}}$ of the duration of the scheduling window is calculated as follows:

$$\begin{aligned} D_{SW_{max}} &= \min\{(45+5)*1024\ \mu s),\ 1/2\min\{20\ ms\}\} \qquad (2)\\ &= \min\{51.2\ ms,\ 10\ ms\}\\ &= 10\ ms. \end{aligned}$$

Figure 3:
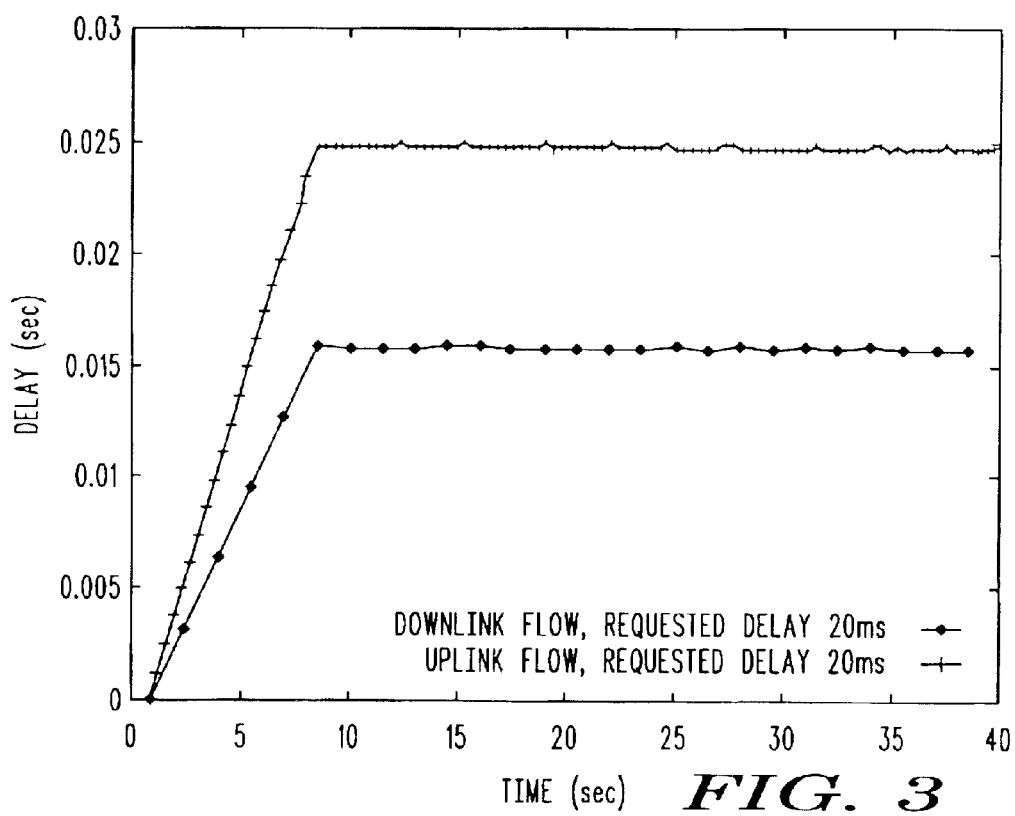
FIGS. 3 and 4 are delay versus time graphs showing the results for simulations of a QoS enabled WLAN using scheduling windows having durations of 11 ms and 9 ms units, respectively.
Figure 4:
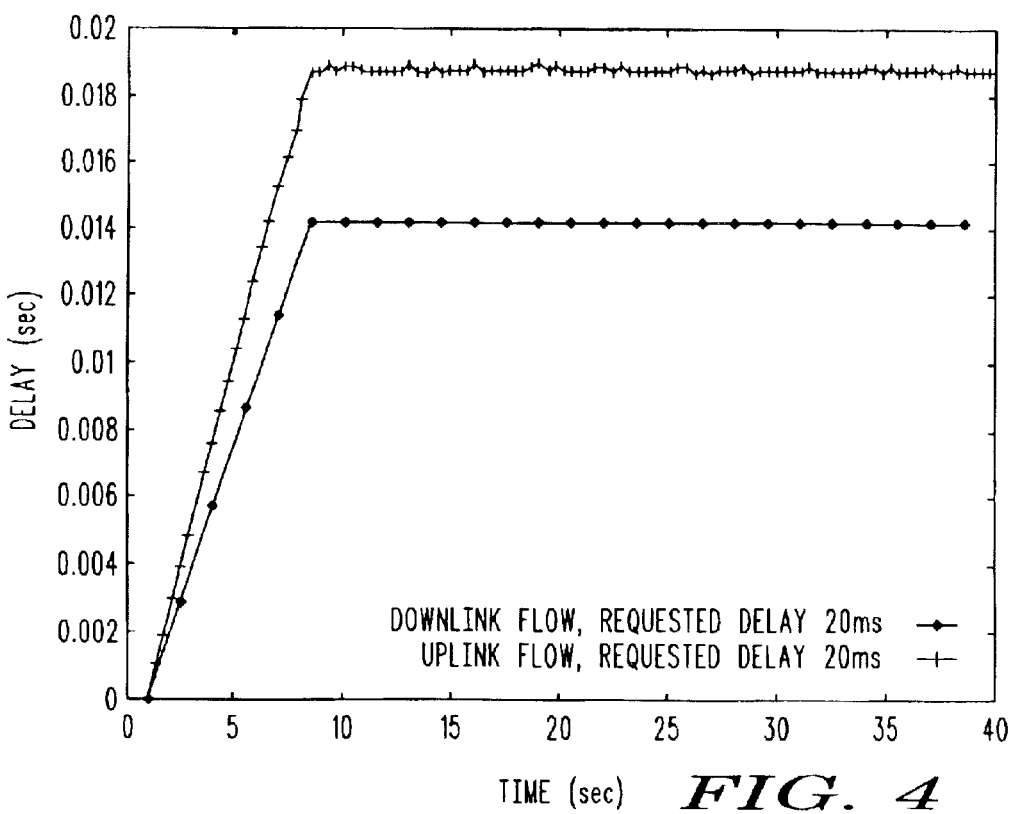

To illustrate the effect of the upper limit $D_{SW_{max}}$ of the duration of the scheduling window, FIGS. 3 and 4 show the results for simulations of a QoS enabled WLAN involving the IEEE 802.11e Hybrid Coordinator Function (HCF) controlled channel access mechanism using scheduling windows having durations of 11 ms and 9 ms units respectively. The Hybrid Coordinator Function controlled channel access mechanism manages access to the communication channel during the Contention Free Period. The HCF is based on a Hybrid Coordinator (HC), which is typically operating in an access point. The HC has a higher access priority over the communication channel than a non-access point device, hence its control of the wireless communication channel. The HC schedules and grants Transmission Opportunities (TxOPs) to the wireless devices. To do so the HC uses the packet scheduler described above and a set of control and management frames described by the IEEE 802.11e Task Group.

The simulation shown in FIG. 3 has a scheduling window above the calculated upper limit $D_{SW_{max}}$ of 10 ms. In each of the simulations, a delay experienced by data packets from the access point 215 to one of the wireless devices 220 or 221 is illustrated as a downlink flow, and a delay experienced by data packets from that wireless device 220 or 221 to the access point 215 is illustrated as a uplink flow. As will be readily appreciated by those skilled in the art, the delay experienced by data packets in the uplink flow is greater than that in the downlink flow due to the increased protocol overhead in the uplink flow case.

In the results shown in FIG. 3, the QoS delay requirement for the downlink is approximately 15 ms, below the requested delay of 20 ms, but the QoS delay requirement for the uplink flow of 20 ms is not met as the delay experienced by data packets in the uplink flow is 25 ms (i.e. exceeding the requested delay of 20 ms). This may be compared with the results obtained in the case shown in FIG. 4 where the scheduling window has a duration of 9 ms, which is below the upper limit $D_{SWmax}$ of 10 ms. In that case, both the downlink flow and the uplink flow (approximately 14 ms and 19 ms, respectively) meet the QoS delay requirements.

In a preferred embodiment of the invention, the duration $D_{SW}$ of the scheduling window is calculated as:

$$D_{SW}=[D_{SWmax}]_{int}-k, \qquad (3)$$

where $[.]_{int}$ is an integer function that returns an integer value, and k is an integer constant chosen such that the duration $D_{SW}$ of the scheduling window is a sub-multiple of the duration of the CFP $D_{CFP}$. Integer k may be a heuristic value determined for different flows, taking into consideration application requirements.

Figure 5:
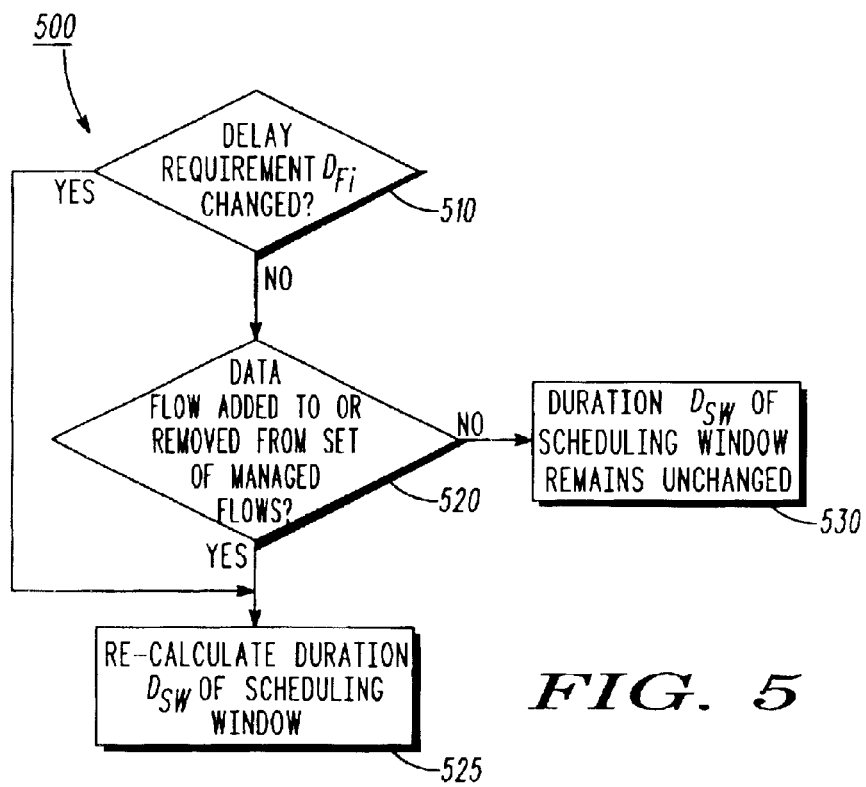
FIG. 5 is a flow diagram schematically depicting a method of adaptively resizing the scheduling window in accordance with, an embodiment of the invention.

FIG. 5 shows a schematic flow diagram of a method 500 performed by the packet scheduler of the access point 215 of adaptively resizing the scheduling window. The method 500 is performed at the end of each scheduling window, and the revised duration $D_{SW}$ of the scheduling window is applied at the time of the next CFP.

The method 500 starts in step 510 where the central processing unit 105 (FIG. 2) determines whether a delay requirement $D_{Fi}$ of one or more of the data flow(s) being managed has changed. If none of the delay requirements $D_{Fi}$ of the data flows have changed (N), then the method 500 continues to step 520. In step 520, the central processing unit 105 determines whether one or more data flow(s) is added to or removed from the set of managed flows. If the set of managed flows remained unchanged (N), processing continues at step 530, where the method 500 ends, as the duration $D_{SW}$ of the scheduling window remains unchanged.

If the central processing unit 105 determines in step 510 that a delay requirement $D_{Fi}$ of one or more of the data flows has changed (Y), or in step 520 that one or more data flow(s) is added to or removed from the set of managed flows (Y), then the method 500 continues at step 525. In step 520, the duration $D_{SW}$ of the scheduling window is re-calculated using Equation (1) and (3) before method 500 ends. The new duration $D_{SW}$ of the scheduling window is applied at the time of the next CFP.

Advantageously, the present invention provides for adaptively changing the scheduling window that is appropriate for Qos requirements of data flows in a wireless local area network.

The detailed description provides preferred an exemplary embodiment only, and is not intended to limit the scope, applicability, or configuration of the invention. Rather, the detailed description of the preferred exemplary embodiment provides those skilled in the art with enabling descriptions for implementing preferred exemplary embodiment of the invention. It should be understood that various changes may be made in the function and arrangement of elements without departing from the spirit and scope of the invention as set forth in the appended claims.

We claim:

1. A method of adaptively changing the duration of a scheduling window of a quality of service enabled local area network, said method comprising the steps of:
   determining a minimum delay of delay requirements of data flows in said network to be scheduled;
   calculating said duration of said scheduling window based on said minimum delay; and
   applying said duration of said scheduling window at a next scheduling interval, wherein said duration of said scheduling window is shorter than a minimum of either: a Contention Free Period plus a Contention Period, or half of said minimum delay.

2. The method according to claim 1, wherein said duration of said scheduling window is shorter than:

$$\min\{(DCFP+DCP), \tfrac{1}{2}\min\{DFi\}\}$$

where DCFP and DCP are the durations of a Contention Free Period (CFP) and a Contention Period (CP) respectively, and DFi is the delay requirement of data flow i.

3. The method according to claim 1, wherein said duration of said scheduling window is given by:

$$[\min\{(DCFP+DCP), \tfrac{1}{2}\min\{DFi\}\}]_{int}-k$$

where DCFP and DCP are the durations of a Contention Free Period (CFP) and a Contention Period (CP) respectively, DFi is the delay requirement of data flow i, and k is an integer constant such that said duration of said scheduling window is a sub-multiple of the duration of said CFP.

4. The method according to claim 1, further comprising the steps of:
   determining if one or more of said delay requirements of said data flows has changed; and
   if one or more of said delay requirements is determined to have changed, re-calculating said duration of said scheduling window based on said minimum delay.

5. The method according to claim 1, further comprising the steps of:
   determining if one or more data flows have been added to or removed from said data flows; and
   if said one or more data flows have been added or removed, re-calculating said duration of said scheduling window based on said minimum delay.

6. The method according to claim 1, wherein said determining and calculating steps are performed at the end of a scheduling window, and a revised duration of said scheduling window is applied at the time of a next Contention Free Period.

7. A packet scheduling device in a quality of service enabled local area network for adaptively changing the duration of a scheduling window, said packet scheduling device comprising:
   a transceiver for communicating with another communication device in said local area network:
   a memory for storing information about delay requirements of data flows to be scheduled;
   a processing unit coupled to said memory and said transceiver for processing said communications, said processing unit determining a minimum delay of said delay requirements of said data flows to be scheduled, calculating said duration of said scheduling window based on said minimum delay, and applying said duration of said scheduling window at a next scheduling interval, wherein said duration of said scheduling window is shorter than a minimum of either; a Contention Free Period plus a Contention Period, or half of said minimum delay.

8. The packet scheduling device according to claim 7, wherein said processing unit is a processor.

9. The packet scheduling device according to claim 7, wherein said duration of said scheduling window is shorter than:

$$\min\{(DCFP+DCP), \tfrac{1}{2}\min\{DFi\}\}$$

where DCFP and DCP are the durations of a Contention Free Period (CFP) and a Contention Period (CP) respectively, and DFi is the delay requirement of data flow i.

10. The packet scheduling device according to claim 7, wherein said duration of said scheduling window is given by:

$$[\min\{(DCFP+DCP), \tfrac{1}{2}\min\{DFi\}\}]\text{int}-k,$$

where DCFP and DCP are the durations of a Contention Free Period (CFP) and a Contention Period (CP) respectively, DFi is the delay requirement of data flow i, and k is an integer constant such that said duration of said scheduling window is a sub-multiple of the duration of said CFP.

11. The packet scheduling device according to claim 7, wherein said processing unit determines if one or more of said delay requirements of said data flows has changed, and if one or more of said delay requirements is determined to have changed, re-calculates said duration of said scheduling window based on said minimum delay.

12. The packet scheduling device according to claim 7, wherein said processing unit determines if one or more data flows have been added to or removed from said data flows, and if said one or more data flows have been added or removed, re-calculates said duration of said scheduling window based on said minimum delay.

13. The packet scheduling device according to claim 7, wherein said processing unit performs said determining and calculating at the end of a scheduling window, and applies a revised duration of said scheduling window at the time of a next Contention Free Period.

14. The packet scheduling device according to claim 7, where said transceiver, said processor and said memory are implemented in an access point coupled to said local area network.

15. A quality of service enabled wireless local area network comprising:

a plurality of wireless devices, each wireless device having one or multiple associated data flow(s) and each of said data flows having an associated delay requirement; and a packet scheduling device for scheduling said data flows during a scheduling window period, wherein said packet scheduling device adaptively changes the duration of said scheduling window period based on a minimum of said delay requirements of said data flows, wherein said duration of said scheduling window is shorter than a minimum of either: a Contention Free Period plus a Contention Period, or half of said minimum delay.

16. The quality of service enabled wireless local area network according to claim 15, wherein said duration of said scheduling window is shorter than:

$$\min\{(DCFP+DCP), \tfrac{1}{2}\min\{DFi\}\}$$

where DCFP and DCP are the durations of a Contention Free Period (CFP) and a Contention Period (CP) respectively, and DFi is the delay requirement of data flow i.

17. The quality of service enabled wireless local area network according to claim 15, wherein said duration of said scheduling window is given by:

$$[\min\{(DCFP+DCP), \tfrac{1}{2}\min\{DFi\}\}]\text{int}-k$$

where DCFP and DCP are the durations of a Contention Free Period (CFP) and a Contention Period (CP) respectively, DFi is the delay requirement of data flow i, and k is an integer constant such that said duration of said scheduling window is a sub-multiple of the duration of said CFP.

* * * * *